United States Patent [19]
Carlson et al.

[11] Patent Number: 5,878,851
[45] Date of Patent: Mar. 9, 1999

[54] CONTROLLABLE VIBRATION APPARATUS

[75] Inventors: J. David Carlson; Kenneth A. St. Clair, both of Cary; Michael J. Chrzan, Apex, all of N.C.; Donald R. Prindle, North East, Pa.

[73] Assignee: Lord Corporation, Cary, N.C.

[21] Appl. No.: 674,179

[22] Filed: Jul. 2, 1996

[51] Int. Cl.⁶ .................................................. F16F 9/06
[52] U.S. Cl. ................... 188/269; 188/267; 188/322.15; 267/140.14
[58] Field of Search ..................... 188/267, 269, 188/314, 322.12, 322.15, 322.22, 298, 299; 267/140.14; 280/707

[56] References Cited

U.S. PATENT DOCUMENTS

| | | | |
|---|---|---|---|
| 2,661,596 | 12/1953 | Winslow | 60/52 |
| 2,667,237 | 1/1954 | Rabinow | 188/88 |
| 2,846,028 | 8/1958 | Gunther | 188/88 |
| 2,940,749 | 6/1960 | Kemelhor | 188/267 X |
| 2,973,969 | 3/1961 | Thall | 280/124 |
| 3,059,915 | 10/1962 | Kemelhor | 267/1 |
| 3,139,760 | 7/1964 | Pfeifer | 74/44 |
| 3,174,587 | 3/1965 | Walton | 188/87 |
| 4,351,515 | 9/1982 | Yoshida | 267/8 R |
| 4,679,775 | 7/1987 | Funaki et al. | 267/64.27 |
| 5,018,606 | 5/1991 | Carlson | 188/267 |
| 5,092,626 | 3/1992 | Athanas et al. | 188/299 X |
| 5,152,379 | 10/1992 | Sackett et al. | 188/299 |
| 5,180,145 | 1/1993 | Watanabe et al. | 188/267 X |
| 5,233,834 | 8/1993 | Tsukamoto | 188/267 X |
| 5,259,487 | 11/1993 | Petek | 188/267 |
| 5,269,537 | 12/1993 | Kiesel | 277/164 |
| 5,277,281 | 1/1994 | Carlson et al. | 188/267 |
| 5,284,330 | 2/1994 | Carlson et al. | 267/140.14 |
| 5,323,133 | 6/1994 | Heath et al. | 335/222 |

(List continued on next page.)

FOREIGN PATENT DOCUMENTS

| | | |
|---|---|---|
| 0 044 577 | 6/1981 | European Pat. Off. . |
| 0 490 299 | 6/1992 | European Pat. Off. . |
| 534 327 | 3/1993 | European Pat. Off. . |
| 44 36 056 | 3/1996 | European Pat. Off. . |
| 1 037 787 | 9/1953 | France . |
| 1 094 516 | 12/1954 | France . |
| 2 672 742 | 8/1992 | France . |

(List continued on next page.)

OTHER PUBLICATIONS

J.D. Carlson, D. M. Gatanzarite and K.A. St. Clair, "Commercial Magneto–Rheological Fluid Devices", 1995, Lord Corporation, LL–8001.

Lord Corporation, "Rheonetic Magnetic Fluid Systems", 1996, PB8003.

*Primary Examiner*—Robert J. Oberleitner
*Assistant Examiner*—Pamela J. Lipka
*Attorney, Agent, or Firm*—Randall S. Wayland

[57] ABSTRACT

A controllable vibration apparatus having an electrical connection to a controllable valve made through a single-strand electrical conductor. In one embodiment, the piston and rod are preferably used as the source of ground or return electrical path. An axially compressed sealing element provides radial sealing against the conductor. An accumulator including a flexible diaphragm provides separation of fluid and accumulator chambers. In magnetorheological (MR) fluid dampers, a special sealing system including a relationship between piston rod surface finish and particle size is provided. A surface treated metal bushing is used with a lip seal to prevent escape of fluid and support side loads. The controllable valve can be formed from top and bottom pole pieces spaced from an outer ring to define a passageway. The pole and ring are preferably secured together by non-magnetic bridging elements. Preferably, the coil assembly is configured with integral axially-extending pins for ease of connection. Push-on connectors preferably make the connection between the conductor and pins. In a two single-strand conductor version, one single-strand carries the incoming current and the other the outgoing current.

41 Claims, 6 Drawing Sheets

U.S. PATENT DOCUMENTS

| | | | |
|---|---|---|---|
| 5,382,373 | 1/1995 | Carlson et al. | 252/62.55 |
| 5,398,917 | 3/1995 | Carlson et al. | 267/140.14 |
| 5,449,150 | 9/1995 | Watanabe et al. | 188/267 X |
| 5,477,946 | 12/1995 | Kawamata et al. | 188/267 |
| 5,480,536 | 1/1996 | Suehiro et al. | 205/151 |
| 5,492,312 | 2/1996 | Carlson | 267/140.14 |

FOREIGN PATENT DOCUMENTS

| | | | |
|---|---|---|---|
| 1 926 000 | 11/1969 | Germany. | |
| 1926000 | 11/1969 | Germany. | |
| 2 123 679 | 7/1972 | Germany. | |
| 36 31 107 | 3/1988 | Germany. | |
| 37 24 361 | 2/1989 | Germany. | |
| 38 00 678 | 7/1989 | Germany. | |
| 39 25 794 | 2/1991 | Germany. | |
| 42 38 734 | 5/1994 | Germany. | |
| 60113711 | 1/1983 | Japan. | |
| 59-009331 | 1/1984 | Japan. | |
| 62-106136 | 5/1987 | Japan | F16F 9/46 |
| 63-280941 | 5/1987 | Japan. | |
| 0258238 | 11/1987 | Japan | 188/267 |
| 119804 | 11/1959 | U.S.S.R. | 188/267 |
| 2 255 150 | 10/1992 | United Kingdom. | |
| 2267947 | 4/1995 | United Kingdom | F16F 9/53 |

CONTROLLABLE VIBRATION APPARATUS

FIELD OF THE INVENTION

This invention relates to the area of controllable vibration devices such as linear-acting fluid damping devices. Specifically, the invention relates to improvements in controllable vibration devices for providing controllable forces. Certain aspects of this invention have particular applicability to linear and magnetorheological (MR) fluid dampers.

BACKGROUND OF THE INVENTION

Controllable vibration devices include controllable linear and rotary fluid dampers, mounts and the like. In particular, magnetorheological fluid devices include a magnetorheological fluid, i.e., a medium having magnetically soft particles suspended in a carrier fluid. One MR Fluid is described in commonly assigned U.S. Pat. No. 5,382,373 to Carlson et al. MR dampers are known and include both rotary and linear acting varieties. Rotary devices can be used as brakes, clutches and the like, for providing variable torque while linear-acting devices can be used for damping linear motion or for providing controllable dissipative forces along the damper's axis. For example, MR devices have been found useful in a wide variety of areas. MR dampers have been incorporated in vehicle engine mounts. One such device is taught in commonly assigned U.S. Pat. No. 5,398,917 to Carlson et al. In the mounting application, a rheology change of the MR fluid is used to control the engine motions by controlling the damping level therein. Other MR fluid devices are taught in the commonly assigned U.S. Pat. No. 5,277,281 and 5,284,330 to Carlson et al. which describe axially acting (linear) dampers and devices including seal-less designs and in U.S. Pat. No. 5,492,312 to Carlson relating to Multi-Degree of freedom MR devices.

Copending applications Ser. No. 08/613,704 entitled "Portable Controllable Fluid Rehabilitation Devices" and Ser. No. 08/304,005 entitled "Magnetorheological Fluid Devices and Process of Controlling Force in Exercise Equipment Utilizing Same", both by Carlson et al., describe rotary dampers utilizing a controllable fluid for exercise and rehabilitation use. Copending applications Ser. No. 08/534,078 entitled "Controllable Seat Damper Systems and Control Method Therefor" and Ser. No. 08/639,139 entitled "Control Method for Semi-Active Damper" both by Catanzarite describe use and control of dampers.

A number of problems have emerged in developing viable controllable fluid dampers. First, the insertion of a valve within the piston of an MR damper as shown in FIG. 9a–9d of U.S. Pat. No. 5,284,330, generally may involve a great deal of machining: a single block of metal is machined out to provide space therein for the coil; then, MR fluid passageways are created by drilling or machining with very small diameter drills or cutting tools. Such machining is time-consuming and labor-intensive, resulting in a high cost part. Therefore, a valve construction is needed which is magnetically equivalent and easy to manufacture.

Second, providing electrical current to the controllable device to adjust the force properties of the device is difficult. The electrical connection of a power/current source to a moving member is addressed in commonly assigned U.S. Pat. No. 5,323,133. While this solution is suitable for some applications, the sealing of an electrical lead passing into a fluid chamber presents pressing difficulties. The sealing problem is aggravated in some applications, such as dampers, as the fluid pressures may be in excess of 500 psi. A cost-effective, and preferably high-pressure-handling solution for providing electrical power to vibration control devices, and in particular, to the electrically-controllable valves in dampers is needed. Further, easier and more manufacturable ways of making the internal electrical connections to the controllable-force components (e.g. controllable valves) are also needed.

Third, providing a proper seal between the piston rod and the aperture in the housing cap of which slidably receives the piston rod is particularly problematic, especially in an MR fluid device. The magnetically soft particles which are contained in fluid suspension within a MR fluid are for example, nominally between about 1 and about 6 microns, with a small percentage of the particles being outside of that range. These particles can readily work their way between the piston rod and its seal and, as a result of their abrasive nature, quickly abrade the seal. Therefore, a solution to the sealing problem in an MR damper is needed to effectuate longer life of the seals.

Fourth, a fluid accumulator to accommodate the fluid expansion and piston rod displacement in an damper, such as an MR damper, is needed. Prior art devices used accumulators of the floating-piston variety as taught in commonly assigned U.S. Pat. No. 5,284,330. MR fluid is displaced by the piston rod as it slidably enters the fluid chamber and also due to the fluid expansion/contraction resulting from thermal effects. The accumulator takes up, i.e., accommodates this fluid displacement/expansion. In an MR damper, the magnetically soft particles within the MR fluid can readily abrade any seal contained in the prior art floating-piston accumulator. It is important, then, to minimize contact between the seal and the magnetically soft particles and to minimize movement of the piston, to whatever extent is possible. This will, in turn, minimize wear. Furthermore, prior art high-pressure devices required a pressurizing valve, which is expensive. Therefore, there is a need for an inexpensive and durable accumulator system for MR devices. Any such accumulator system may have applicability to other dampers as well.

Fifth, another potential area of wear is at the interface between the piston and the damper body. The provision of an appropriate wear reducing surface and/or wear band is essential to meet the demanding life requirements for dampers. Further, it is desirable to have a wear system which will enhance the overall performance of the MR device. Therefore, there is a dire need for a wear reducing system for a MR damper.

SUMMARY OF THE INVENTION

Therefore, given the benefits and drawbacks of the prior art, the present invention is directed to controllable vibration devices, for example, linear controllable fluid dampers, and more particularly, to a magnetorheological (MR) fluid dampers which solves the problems associated with the prior art.

In one aspect, the MR damper includes a piston assembly comprising a piston rod, a top pole piece of magnetically soft material, an annular outer ring of magnetically soft material surrounding said top pole piece, preferably non-magnetic bridge means attaching said top pole piece to said outer ring, a coil assembly positioned beneath said top pole piece, a bottom pole piece connected to said piston rod and clamping said coil assembly into position relative to the pole pieces. This piston assembly configuration eliminates a great deal of the machining, eases assembly and reduces costs. It is also envisioned that the top pole piece, outer ring, and bottom pole piece may be made using Powder Injection Molding (PIM) or Metal Injection Molding (MIM) techniques in which powdered metal is suspended in a plastic resin matrix, the material is injection molded into the desired shape, the part is treated to remove the resin, and then sintered to provide a sufficiently high density metal part that exhibits superior magnetic properties. Further, the inventors discovered that the use of certain powdered metal materials for the pole pieces provides comparable results as wrought-machined pole pieces. Furthermore, the top pole piece and outer ring may be made as a unit using PM techniques.

In a second feature of the present invention, an apparatus for providing electrical current to a controllable element within a controllable vibration device (i.e., a feature of the present invention with potentially broader application than simply in MR devices) includes a device body having an internal cavity therein, a piston assembly interacting with said internal cavity, and a fluid contained within said internal cavity. An electrically-controllable member, such as a valve or fluid oscillator is provided for controlling the flow of the fluid in said internal cavity, such as between the upper and lower chambers of a damper, the improvement comprising: circuit means for carrying a high-potential electrical current to said electrically-controllable member, said circuit means including a single-strand electrical conductor passing into said internal cavity, and means for completing said circuit means to a low potential. Preferably, an elastomeric element, which is preferably grommet-like, is axially compressed such that it radially bulges against the single-strand electrical conductor to seal same about its outer periphery. In a damper, the elastomeric element may also compress between an end of the piston rod and a portion of the piston assembly (such as bottom pole piece) to radially expand the element into fluidic sealing engagement therewith. Alternate embodiments are directed to a multiple single-strand conductor embodiment where one single-strand path is incoming and the other is outgoing. Various means for making the internal electrical connections are described, including simple push-on electrical connectors and use of axially-directed and electrically-conductive pins formed on a coil assembly.

A third feature of the present invention is a MR fluid damper including a damper body having an internal cavity containing an amount of MR fluid therein, having an aperture formed in one end slidingly receives a piston rod, and wherein saw damper includes a novel system to seal said aperture against egress of fluid. The novel seal system preferably includes a piston rod which has a nominal surface finish in which the scratch depth (Rz) is no greater than a defined percentage of the nominal size of the magnetically soft particles contained in said MR fluid. The sealing system may be further enhanced by surface treating the piston rod with chrome, boron carbide, molybdenum or tungsten, or other like hardened wear surface treatments. The piston rod may have, for example, a surface roughness of about Rz 12 microinch to about Rz 20 microinch for a MR fluid having a nominal magnetically soft particle size of about 2 microns.

In a further aspect, an elastomeric seal surrounding said piston rod adjacent one end of said internal cavity and a metallic bushing (bearing element) positioned outwardly along said piston rod from the seal and bearing assembly. It was discovered by the inventors that manufacturing the elastomeric seal from a fluorocarbon elastomeric material having a durometer in the range of about 65 to about 90 further adds to the life of the seal system in an MR damper. Also, in systems where side loads to the damper are important, the bushing element needs superior wear properties.

A fourth feature of the present invention is a MR fluid damper comprising a damper body made of magnetically soft material and defining an internal cavity which contains an amount of MR fluid therein, said damper body having an aperture in one end thereof, a piston rod slidingly engaged in said aperture, means to seal said piston rod in said aperture against egress of said MR fluid, a piston assembly attached to one end of said piston rod, said piston including a magnetic field generating valve means for controlling flow of MR fluid therethrough, the improvement comprising: using the damper body as a substantial part of the magnetic circuit. This enables improved performance from the MR valve.

In another aspect, at least one wear band is secured about the periphery of said piston, said wear band being made of a magnetically soft material, whereby both the wear band and said damper body form a part of a magnetic circuit used in controlling the flow of MR fluid through the controllable valve. The wear band is preferably made of steel and may preferably be surface treated to reduce friction. This treatment may take the form of a layer of porous bronze or nickel with fluorinated polyethylene polymer impregnated into the porous portion. In another aspect, the wear band may be eliminated and the surface treatment may be placed on an outer portion of the annular ring.

A fifth feature of the present invention, and another feature with application beyond its use with MR dampers, is a fluid damper including a damper body defining an internal cavity containing an amount of liquid and having an aperture formed in one end thereof, a piston rod slidingly received in the aperture, a piston secured to one end of the piston rod and subdividing said cavity into two chambers, the improvement comprising: an accumulator assembly which is positioned adjacent to one of the two working chambers and partially defines an accumulator chamber which is devoid of liquid and includes a pressurized compressible gas, said accumulator assembly being capable of movement in response to movement of said piston and is sealed by a sliding seal retained within a body portion which slides against an inner periphery of said damper body, said accumulator assembly further includes a flexible partition secured to the body portion, which is preferably a flexible diaphragm, whereby the flexible partition acts as a fluid tight partition between the accumulator chamber and the working chamber and absorbs low-amplitude movements of said piston making movement of said seal against said inner periphery of said damper body unnecessary. Notably, the sliding function is retained for large amplitude motions. This ability to accommodate small amplitudes without movement of the body portion saves wear and tear on the periphery seal.

A sixth feature of the present invention, and another feature with application beyond its use with MR dampers, is a single-tube fluid damper comprising: a damper body defining an internal cavity containing an amount of liquid and having an aperture formed in one end thereof, a piston rod slidingly received in said aperture, a piston secured to one end of said piston rod and subdividing the internal cavity into two chambers, a flexible diaphragm assembly positioned adjacent one of said two chambers and defining an accumulator chamber which is filled with compressible gas and pressurized to about 100–500 psi without a fill valve wherein said flexible diaphragm assembly being capable of movement in response to movement of said piston.

It is an advantage of the present invention that an electrical connection to the controllable member (e.g. a controllable valve) can be made simply and cost-effectively and can withstand the high pressures such as those present in linear dampers.

It is an advantage of the present invention that wear of the MR piston assembly and sidewalls is dramatically reduced which resultantly reduces valve blow-by which can detract from peak performance.

It is an advantage of the present invention that by using the damper body as a substantial part of the magnetic circuit, the damper performance can be increased (e.g. on-state forces can be increased or off-state forces may be decreased).

It is an advantage of the present invention that the novel seal system of the damper dramatically increases the aperture seal life and enables meeting the multi-million cycle requirements for most linear MR damper applications.

It is an advantage of the present invention that it provides a simple, cost-effective means for pressurizing the damper which eliminates the need for an expensive fill valve.

It is an advantage of the present invention that it provides an effective accumulator assembly including an flexible member which accommodates low-amplitude oscillations without causing the seal to slide and, therefore, increases the life of the accumulator seal.

It is an advantage of the present invention that it provides a simple, high-performance, and cost-effective MR valve configuration.

The abovementioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate several embodiments of the present invention. The drawings and description together, serve to fully explain the invention. In the drawings, FIG. 5b is a bottom view of a piston assembly of FIG. 5a, and FIG. 6 and 7 are graphical depictions illustrating the wear (weight loss) versus various wear material combinations.

DETAILED DESCRIPTION OF THE PREFERRED EMBODIMENTS

Figures 1A, 1B, 1C, 1D:
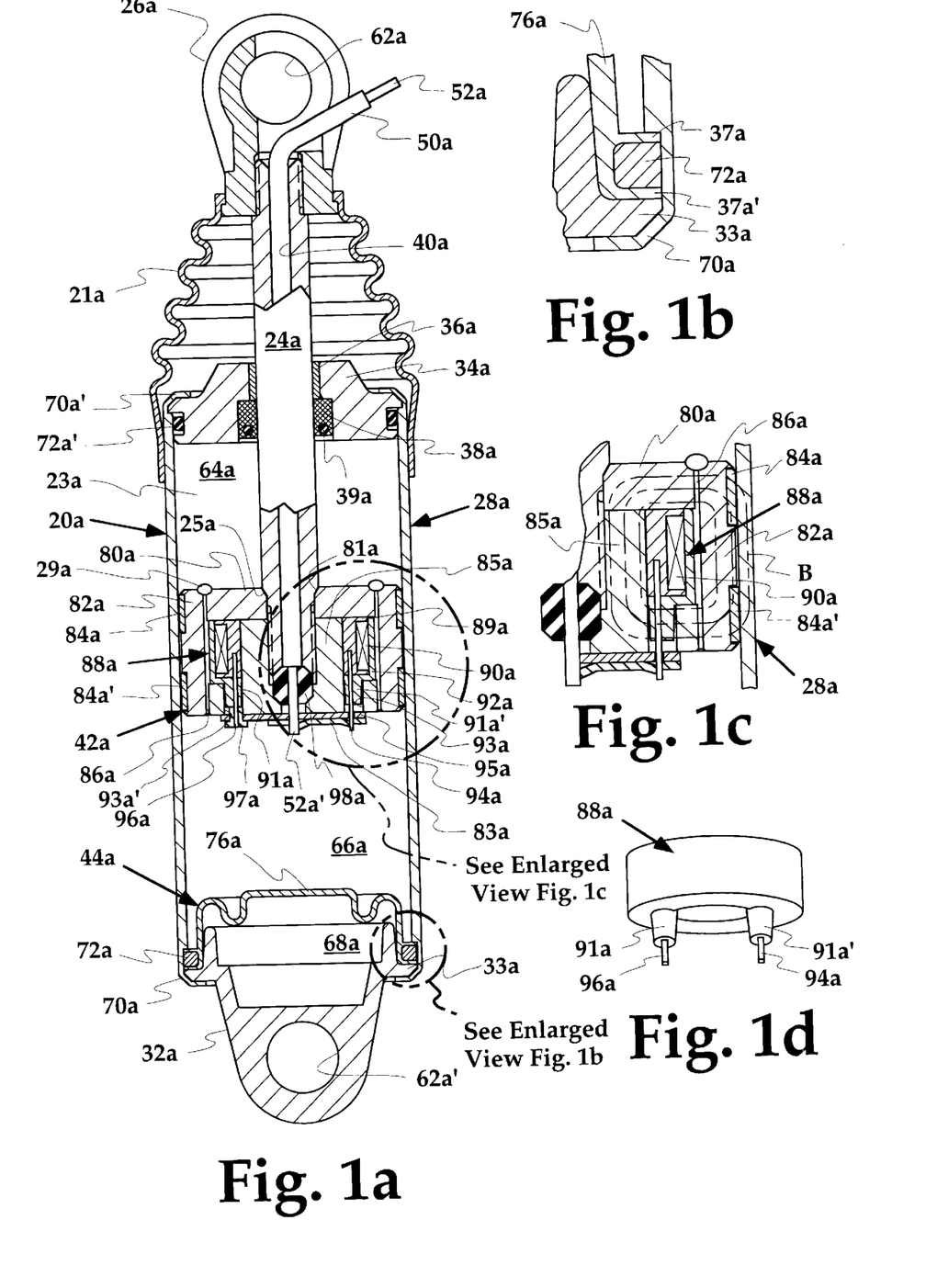
FIG. 1a is a partially cross-sectioned side view of one embodiment of the present invention MR fluid damper.
FIG. 1b is a partial and enlarged cross-sectioned side view of the crimped portion of the accumulator diaphragm.
FIG. 1c is a partial and enlarged cross-sectioned side view of a piston assembly and damper body illustrating an estimate for the lines of magnetic flux present in the outer ring and damper body.
FIG. 1d is an isometric view of a drop-in coil assembly.

With reference to the various figures herein, where like reference characters are employed where possible to indicate like parts, there is shown in FIG. 1a a linear-type controllable damper, and more specifically, a magnetorheological (MR) fluid damper shown generally at 20a. It will be understood that, while the invention is described in conjunction with MR damper embodiments, several aspects of the invention have broader applicability and may be used in other controllable fluid devices, such as Electrorheological (ER) dampers, controllable hydraulic devices, mounts and other controllable vibration devices. Damper 20a comprises a generally cylindrical damper body or housing 28a closed on a first end by end cap 32a and on the other end by top cap 34a creating an internal cavity. Top cap 34a has a central aperture that slidingly receives piston rod 24a.

The aperture in the cap 34a and piston rod 24a include various features which are part of a novel MR seal and bearing system. That system includes a metal bushing 36a, an elastomeric seal 38a, and a defined relationship between the nominal surface finish (scratch depth Rz) and nominal MR fluid particle size. By way of example and not limitation, metallic bushing 36a may be a Garlock DU bushing of the type which has an outer annulus of steel and an inner surface layer of bronze impregnated with lead and fluorinated polyethylene polymer (e.g. a TEFLON® material). Similarly, elastomeric seal 38a is preferably a lip seal of fluorocarbon elastomer having a durometer in the range of about 65 to about 90, the lip seal being of the energized type, i.e., O-ring 39a flexes the pair of sealing lips inwardly into sealing engagement with the surface of piston rod 24a and outwardly into engagement with the inner circumference of the aperture in top cap 34a. A suitable seal is identified as a Parker poly-pack seal. Metallic bushing 36a and elastomeric seal 38a are each preferably press fit into top cap 34a, with the internal pressure within housing 28a assisting in retention.

As earlier mentioned, sealing of these MR dampers has proved to be particularly troublesome. The soft magnetic or paramagnetic particles suspended in the MR fluid can have, for example, nominal particle sizes in the range of about 1 to about 6 microns, although it will be appreciated that fluids having other particle sizes may also be used. Iron particles having nominal particle sizes in the 1–6 micron range have a small percentage of particles which are substantially smaller than that, say, on the order of a micron or less. If the depth of the scratches in the surface of the piston are of the order of the particle size of the iron, these iron particles are thought to migrate and be pulled upwardly between the seal 38a and the piston rod 24a as the damper 20a is extended as will be described with reference to FIG. 3b. These iron particles are highly abrasive and will quickly degrade the elastomeric seal 38a allowing the MR fluid 23a to escape and cause premature failure of the damper 20a.

It is, therefore, an important aspect of this invention that the surface finish on the piston rod 24a be sufficiently smooth such that the scratches cannot smuggle or carry these particles out of the internal cavity within the damper body 28a and into the seal 38a. FIG. 3b illustrates a piston rod 24a, a seal 38a and scratches 63a, 63a' and 63a" of approximately equal size and depth formed into surface of rod 24a. Particles 65a, 65a' and 65a" of various sizes are shown resting in the scratches 63a, 63a' and 63a". If a particle is small enough in comparison to the scratch depth, then the particle will be carried under the seal 38a. The inventors indicate that a suitable smoothness on the surface of piston rod 24a will provide a nominal scratch depth (Rz) which is no greater than 25% of the nominal iron particle size. For example, for a MR fluid 23a including about 1–6 micron iron particles and a nominal particle size of about 2 micron as illustrated in FIG. 3c, a nominal scratch depth of 0.5 micron upper limit 67 (where 1 micron equals 39.37 $\mu$ inch) of about 20 $\mu$ inch would be selected. Nominal particle size 71 is defined by measuring the number of particles at each size and graphically plotting the distribution. The distribution will generally be a right-skewed to some extent. The surface finish currently being used provides a surface roughness Rz in the range of 12–20 microinches, 20 microinches corresponding to approximately 0.5 micron, which is at the upper limit 67 of the stated range and represents 25% of the nominal particle size of 2 microns. Notably, MR fluids with varying particle sizes would necessitate piston rod finishes affording different surface roughnesses. The lower limit 69 of the range, i.e., 12 microinch Rz is thought to be required also, and is selected because too smooth of a surface finish will not carry any fluid lubrication to the seal 38a.

Besides the surface finish, the seal life can be enhanced by surface treatments such chrome plating, although it is believed that a deposit of boron carbide, tungsten, or molybdenum will provide similar results. The preferable MR fluid 23a for this embodiment, as for all embodiments described herein, includes small, preferably spherical, soft paramagnetic particles, such as magnetite, carbonyl iron powder, iron alloys, iron nitrides, iron carbides, chromium dioxide, low carbon steel, silicon steel, nickel, cobalt or the like, preferably having a nominal diameter of between about 1 and 6 microns and which are disbursed and suspended in a preferably lower viscosity liquid such as silicone oil, hydrocarbon oil, paraffin oil, mineral oil, chlorinated and fluorinated fluids, kerosene, glycol, or water.

Again referring to FIG. 1a, piston rod 24a preferably has an axial bore 40a therethrough which provides a preferable passage for a single-strand electrical conductor 52a which makes the connection with electrically controllable valve located within piston assembly 42a. Conductor 52a preferably has an outer jacket of insulation 50a over the single-strand conductor 52a. Piston 42a is received in damper body 28a and subdivides the internal cavity into upper chamber 64a and lower chamber 66a. The lower chamber 66a has adjacent thereto an accumulator chamber 68a within the accumulator 44a which preferably includes a flexible diaphragm 76a. Accumulator chamber 68a generally contains a high pressure compressible gas, such as nitrogen.

End cap 32a has a bore 62a' which, together with bore 62a in rod end 26a, permit damper body 28a and piston rod 24a to be connected to first and second relatively movable members (not shown) such as when used in a controllable seat suspension system or in a vehicle's primary suspension system.

When end cap 32a is assembled to damper body 28a, the end of cylindrical damper body 28a is crimped as at 70a to secure it in place. This crimping procedure secures rigid ring 72a between flange 33a on end cap 32a and an internal ledge on damper body 28a. Also captured are the bonded skins 37a and 37a' (FIG. 1b) of elastomeric diaphragm 76a. The use of a rigid ring 72a, which is preferably steel, is desirable as a certain amount of rigidity at the crimp 70a is desired for proper load transfer to the damper body 28a and sealing thereof.

Top cap 34a is provided with a circumferential O-ring 72a' to seal the upper joint against fluid loss and, once again, the annular damper body 28a is crimped as at 70a'. A flexible accordion boot 21a is preferably stretched over the exterior of damper body 28a and rod end 26a to protect the damper 20a from dust and dirt particles that may otherwise find their way to, and possibly damage the seal 38a.

Accumulator chamber 68a is pressurized to a level of between about 100 psi and about 500 psi, with a pressure of 300 psi being preferred by performing the crimp operation in a 100–500 psi pressure chamber. First the damper body 28a with rod end 26a, top cap 34a, piston 42a and piston rod 24a installed is filled in an inverted position with MR fluid 23a. The diaphragm 76a is then inserted and those elements are then placed within a pressure chamber, pressurized to 100–500 psi depending upon the level of pressurization desired in damper 20a, and then the end cap 32a is crimped into place sealing the entire unit. This method of assembly and use of a diaphragm 76a in the damper eliminates the need for the valve 75b required in prior art dampers, thereby reducing the cost, complexity, and possibility of valve leakage of the prior art dampers.

Piston 42a contains coil assembly 88a. Coil assembly 88a includes a spool-shaped bobbin 89a on which is coiled with a sufficient number of hoop winds of electrically conductive magnet wire 90a. A first end of the wire 90a extends through an opening (not shown) in bobbin 89a and is preferably soldered to, or wrapped around, electrically-conductive first axial pin 94a. The terminal end of wire 90a is passed beneath the lower flange of bobbin 89a and is preferably soldered to a electrically-conductive second axially extending pin 96a. The coil assembly 88a is completed by at least partially encasing each of the aforementioned elements in a molded element 92a. Element 92a includes a pair of axial locator bosses 91a formed thereon which are received in axial bores 93a and 93a' (FIG. 1a) formed into bottom pole piece 85a. An isometric view of the coil assembly 88a illustrating axial pins 94a, 96a and locator bosses 91a, 91a' can be found in FIG. 1d. The electrical circuit includes the single-strand conductor 52a, the push-on connector 83a, 1st axial pin 94a, coil wire 90a, second axial pin 96a, connector 97a and is grounded via the bottom pole 85a connecting to piston rod 24a and steel rod end 26a. It should be understood that although the single-strand conductor 52a is shown passing into the internal cavity through the piston rod 24a, the single-strand conductor 52a could also pass through the wall of the damper body 28a, such as when the controllable damper valve is located at a base of a twin tube damper.

Figure 4A:
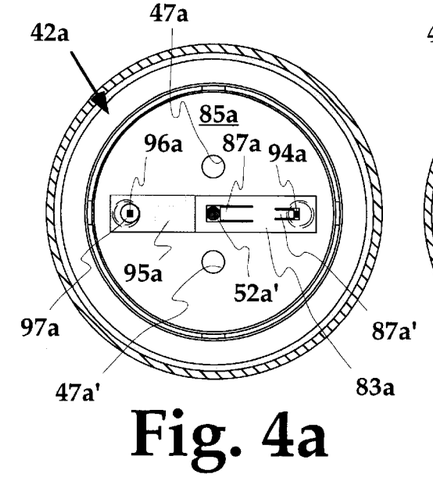
FIG. 4a is a partially cross-sectioned end view of the FIG. 1a MR damper as seen from below the bottom of the piston assembly.
Figure 4B:
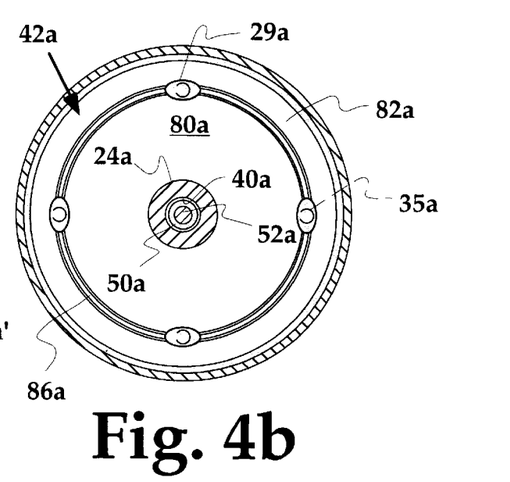
FIG. 4b is a partially cross-sectioned end view of the FIG. 1a MR damper as seen from above the top of the piston assembly.
Figure 4C:
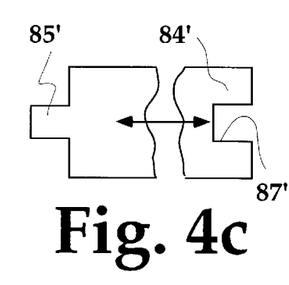
FIG. 4c is a cut side view of a wear band prior to installation on the piston assembly.
Figure 4D:
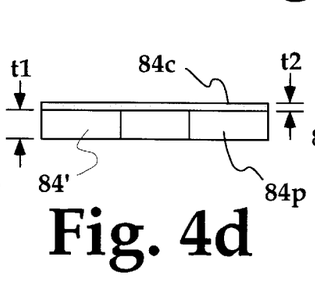
FIG. 4d is an end view of the wear band of FIG. 4c showing a friction-reducing surface treatment.
Figure 4E:
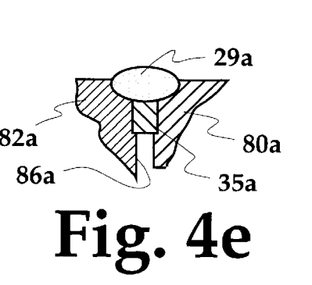
FIG. 4e is a cut-out section of the piston assembly showing the details of nonmagnetic weld-and-pin combination bridge element.

Top pole piece 80a is interconnected to annular ring element 82a by a plurality of bridges elements, in this embodiment, welds 29a (FIG. 4b and FIG. 4e). As shown in FIG. 4b and 4e, the welds 29a are preferably nonmagnetic and may include optional nonmagnetic pins 35a to further locate and retain the top pole 80a relative to the ring 82a. Other nonmagnetic bridging element means are described with reference to FIG. 4g. Making the bridge element from a nonmagnetic material concentrates the magnetic flux generated by energizing coil assembly 88a (FIG. 1a) within the working portion of the passage 86a (FIG. 1a, FIG. 4e) of the MR controllable valve. Preferable materials for the nonmagnetic bridge include austinetic stainless steels such as the 300 series stainless steels. Preferable materials for the top pole piece 80a, bottom pole piece 85a and annular ring 82a are low carbon steels, such as 1018 steel or powdered metal materials as will be described further herein.

As can be seen in FIG. 4b and FIG. 1a, a substantially annular flow passage 86a (interrupted by only the short traversing welds 29a acting as bridging elements) allows the MR fluid 23a to flow through the (gap) fluid passage 86a created through the piston assembly 42a between the ring 82a and top pole piece 80a. Single strand conductor 52a including insulation 50a is passed through bore 40a in piston rod 24a. As shown in FIG. 4e, the gaps in passage 86a may be initially determined by preferably nonmagnetic pins 35a which are pressed into the gap between the ring 82a and the top pole piece 80a then welded over with preferably nonmagnetic (austinetic stainless steel) welds 29a. Welds 29a could be formed by brazing, or soldering with nonmagnetic material as well. It was discovered by the inventors that this aids in proper alignment and retention of ring 82a relative to the top pole piece 80a even if one or more of the welds 29a should break.

Again referring to FIG. 1a, top pole 80a is slidingly received and attaches to piston rod 24a and may have a countersink 81a that engages a chamfer 25a on piston rod 24a to secure and seat top pole 80a. Insulator locator bosses 91a and 91a' allow coil assembly 88a to be dropped into bottom pole piece 85a and the latter is then threaded onto the end of piston rod 24a. An elastomeric element 98a, such as a grommet, O-ring or the like, is axially compressed, upon threading bottom pole piece 85a onto piston rod 24a, between the end of rod 24a and a portion of bottom pole piece 85a to radially expand it into sealing engagement with the lower end 52a' of single-strand conductor 52a. Elastomeric element 98a electrically insulates and fluidically seals between conductor 52a, and a portion of the piston assembly 42a, and specifically seals against bottom pole piece 85a, and piston rod 24a. Preferable materials for the elastomer element 98a are Thermoplastic Elastomer (TPE), silicone elastomer, natural rubber, synthetic rubber, or blends of synthetic and natural or the like which exhibit a hardness of about 50–90 durometer. The elastomer preferably needs to be flexible and fluid impermeable. Notably, this seal means has been tested and holds pressures in excess of 500 psi and prevents fluid egress both around and underneath the insulation on the single-strand conductor 52a. The inventors discovered that it was exceedingly difficult to eliminate flow of MR fluid 23a in multi-strand conductor wires, as it is very difficult and expensive to eliminate flow around the wire and also between the strands.

As shown in FIG. 1a and FIG. 4a an electrically conductive push-on electrical connector 83a is used to make electrical connection between lower end 52a' of single-strand conductor 52a, which will serve as the source of high-potential current, and first axially-directed pin 94a which is part of the coil assembly 88a. The connector of choice is a push-on connector 83a, however other electrical connectors could also be used. The push-on connector 83a extends only as far past the lower conductor end 52a' as necessary to make a solid connection. Wrench holes 47a, 47a' (FIG. 4a) are used for threading bottom pole piece 85a via a spanner wrench onto piston rod 24a during the assembly operation.

As installed, a tab 87a on push-on connector 83a is bent slightly to make a secure electrical engagement with lower conductor end 52a' and tab 87a' is bent slightly to make a secure electrical engagement with first electrically-conductive axial pin 94a. Once pushed on, the push-on connector 83a is very difficult to remove from pin 94a and end 52a'. An insulator plate 95a is positioned between connector 83a and bottom pole piece 85a to prevent any electrical shorting. The outgoing second electrically-conductive axial pin 96a is electrically connected to bottom pole piece 85a by press-in, rivet-like connector 97a.

The piston assembly 42a, the piston rod 24a, the rod end 26a and whatever rod end 26a is attached to, if it is metal, will function as the low potential (or ground) for the electrical circuit. It should be understood that energizing the coil assembly 88a within the electrical circuit means will produce a magnetic field within the magnetic circuit including within it the bottom pole piece 85a, top pole piece 80a, ring 82a and preferably a portion of the damper body 28a (See FIG. 1c). This magnetic flux will cause a change in rheological properties of the MR fluid 23a contained in the electrically controllable valve and restrict flow through the passage 86a. The MR fluid preferably fills the upper and lower chambers 64a and 66a also.

Figure 2:
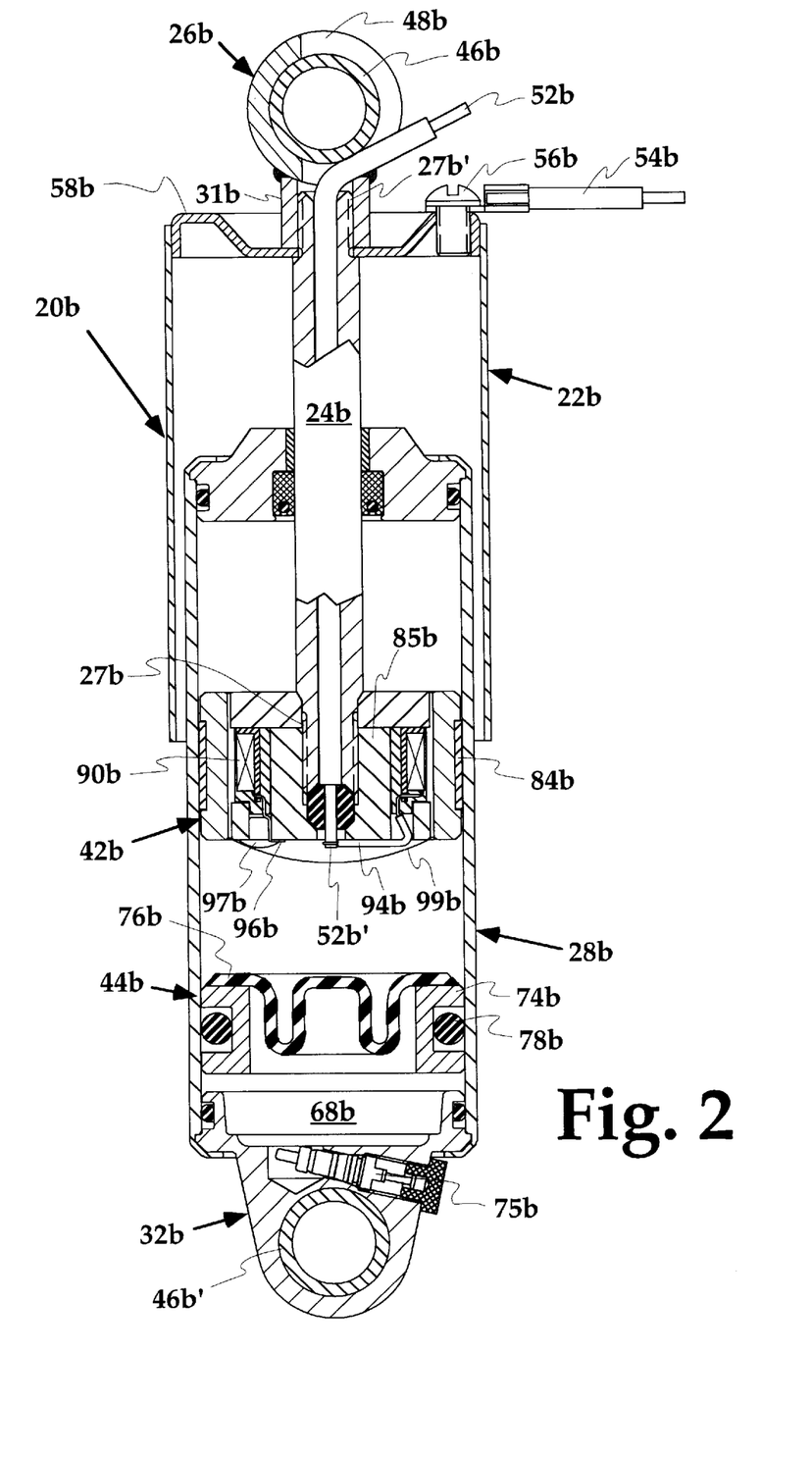
FIG. 2 is a partially cross-sectioned side view of second embodiment of the present invention MR fluid damper.

The outer periphery of piston 42a is preferably equipped with a friction-reducing wear member. As depicted in Figs. 1a and 2, this wear member may take the form of at least one wear band 84a, 84a' and 84b. While this wear band 84a, 84a' and 84b may take the form of a nylon band, it is preferably a metallic element for reasons to be discussed, infra. The preferred configuration of wear band 84a, 84a' and 84b is depicted in FIGS. 4c and 4d.

Metallic wear band 84' has a tongue 85' and a slot 87' that can interdigitate when the wear band 84' is wrapped around the periphery of piston 42a or 42b (FIG. 2). A pair of spot welds (not shown) can be used to secure tongue 85' in slot 87' and the surface of the welds machined to a uniform diameter. As seen in FIG. 4d, wear band 84' has a base or primary metallic layer 84p which is preferably of steel or some other soft magnetic material, and a treatment or coating layer 84c which is preferably porous bronze or nickel coated with a fluorinated polyethylene which may further include lead (e.g. TEFLON®) polymer. The thickness $t_2$ of the coating layer 84c is preferably significantly less than the thickness $t_1$ of the primary layer 84p.

The reason a metallic wear band 84a is preferred is that, as shown in FIG. 1c, by use of a soft magnetic material band, the magnetic flux lines will extend from the top pole piece 80a and bottom pole 85a radially across the flow passage 86a radially into annular ring 82a and into the soft magnetic metal material of damper body 28a and traveling lengthwise along the axis thereof. The estimated lines of flux B are shown in FIG. 1c. Use of prior art nonmetallic wear bands will limit the amount of flux generated in the damper body 28a.

It should be understood that use of the damper body 28a as a "substantial" part of the magnetic circuit, with or without a metal wear band will enable strengthening of the magnetic field. This will enhance the control forces that can be generated by the damper 20a. By the term "substantial", it is envisioned that greater than about 40% of the cross-sectional area of the outer magnetic flux path is through the damper body 28a, or generally, that the flux density in the damper body 28a is approximately 40% or higher of that present in the annular ring 82a. It should be understood that by using the damper body 28a as a substantial part of the magnetic circuit, this enables an increase in size of the coil diameter. Thus, the number of amp-turns of wire 90a in the coil assembly 88a may be increased. Likewise, the cross-sectional area of bottom pole piece 85a may be increased which helps to eliminate magnetic saturation therein. Both of these changes lead to improved performance. Generally, it will be appreciated that the wear bands 84a, 84a' could utilize the metal of annular ring 82a as the primary metal, making the use of a separate wear band 84 unnecessary. This promises to afford the least expensive option. In general, it is desirable to make the outer annular ring 82a as thin as possible, thereby forcing a higher percentage of the flux into the damper body 28a. Using the damper body 28a as a part of the magnetic circuit has the additional advantage of reducing valve blow-by. Valve blow-by exists because of clearance between the annular ring 82a or wear band 84a, 84a' and the inner diameter of damper body 28a which allow MR fluid to escape therebetween instead of through the passage 86a. Magnetic flux acting across this clearance further seals MR fluid's flow therethrough and forces the MR fluid to flow substantially entirely through the passageway 86a. This is thought to enable higher on-state damping forces.

Figure 4F:
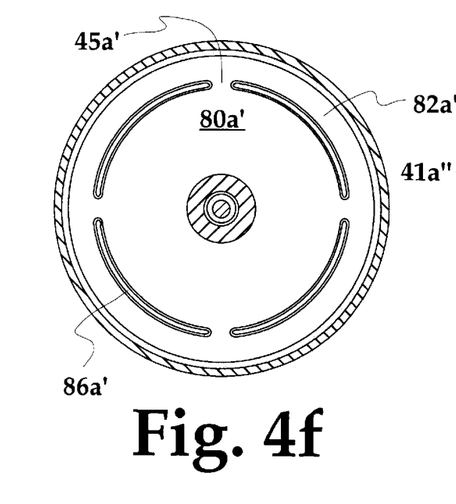
FIG. 4f is a partially cross-sectioned top view of the piston assembly made by a PIM or a MIM process.

While the top pole piece 80a, annular outer ring 82a, and bottom pole pieces 85a have been discussed in terms of conventional metals, it will be appreciated that the use of powdered metal materials and processes such as Powder Injection Molding (PIM) and Metal Injection Molding (MIM) could be used to form the elements. For example, ring 82a and top pole piece 80a may be formed as a single unit with multiple bridging members 45a' replacing welds 29a (FIG. 4b) as shown in FIG. 4f. It is envisioned that such multiple bridging members 45a' would magnetically saturate so as not to act as complete shorts to the flow of magnetic flux across passageway 86a'. It was discovered by the inventors that the top pole piece 80a', annular outer ring 82a', and bottom pole piece 85a could be manufactured using a high-performance powdered metal processes like PIM or MIM without sacrificing any performance as compared to a wrought-machined version when operating below saturation. Further, it was discovered that powdered-metal pole pieces provide advantages in terms of increasing the switching speed of the MR valve as well as reducing remnant magnetism. The inventors also discovered that when the cross-sectional area available for the piston assembly and MR valve is limited, PIM or MIM materials having a density of between about 7.5 and about 7.8 gm/cm$^3$ were preferable, as lower densities tend to operate too far into the saturation zone.

When using PIM or MIM techniques, powdered metal is disbursed in a plastic resin matrix, the metal resin is molded to the preferred shape, the shaped object is cured and the resin removed by using heat or solvents. Finally, the article is sintered to produce the final product. The article can be formed with the desired final dimensions to replace the wrought version with little or no resultant performance loss. Further, the PIM pole pieces may demonstrate superior magnetic properties to conventional wrought metal articles provided they can be operated below their saturation point.

Figure 4G:
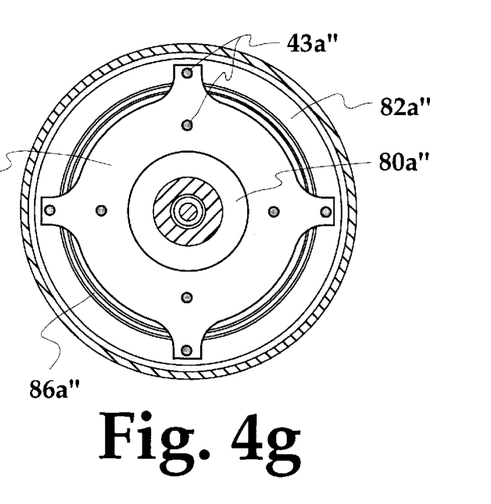
FIG. 4g is a partially cross-sectioned top view of the piston assembly showing spot-welded stainless steel bridge elements.

FIG. 4g illustrates alternate means for attaching the ring 82a" to the top pole piece 80a" which includes a preferably nonmagnetic plate 41a" including radially extending tabs thereon forming the bridging elements across passage 86a".

The plate 41a" is secured to the ring 82a" and top pole piece 80a" by multiple spot welds 43a". Preferable materials for the plate 41a" are nonmagnetic, such as austinetic stainless steel sheet.

A second preferred embodiment of the present invention is shown in FIG. 2 generally at 20b. There are three significant differences between this embodiment and the first embodiment. Firstly, the flexible boot of the previous embodiment is replaced with a dust cover 22b. Secondly, a more conventional insulated wire 94b is used to connect end 52b' of single-strand conductor 52b to coil wire 90b and a rivet 97b is used to ground the opposite end 96b of coil wire 90b to the bottom pole piece 85b. The low potential circuit continues from the piston assembly 42b into the piston rod 24b and into dust cover cap 58b. Fastener 56b then connects a ground cable 54b to cap 58b while insulator bushings 46b and 46b' are used to prevent current flow out of the rod end 26b or end cap 32b. Potting compound 99b may be used to coat any exposed wires, etc. The rod end 26b in this embodiment is manufactured from a steel bushing end 48b welded to threaded portion 31b. Threading rod end 26b onto threads 27b' secures dust cover cap 58b in place. Likewise, threads 27b on rod 24b thread into bottom pole piece 85b and secure piston assembly 42b thereto.

Again referring to FIG. 2, accumulator 44b is formed by an accumulator body 74b with a flexible central diaphragm 76b preferably bonded thereto. An O-ring seal 78b is used to seal the outer periphery of the accumulator body portion 74b against the inner peripheral surface of damper body 28b. The flexible diaphragm 76b, which is preferably natural rubber, synthetic rubber or a combination thereof, will accommodate low amplitude movement of piston assembly 42b without requiring the accumulator body portion 44b to move. This reduction in movement will reduce the wear and tear on seal 78b as for low amplitudes, only the diaphragm 76b will move. Valve 75b may be used to pressurize the accumulator chamber 68b in the damper 20b to the appropriate pressure of between about 100 psi and about 500 psi.

Figure 3A:
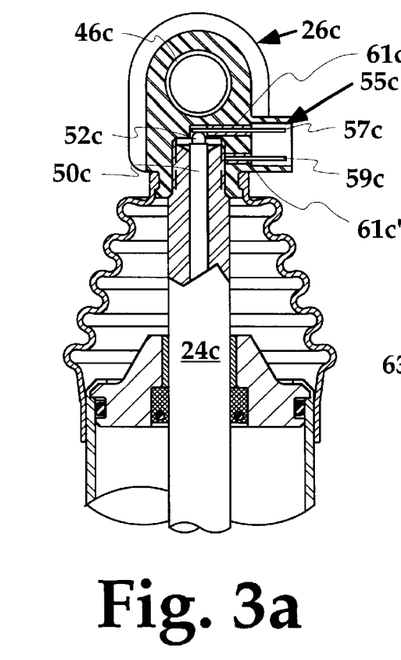
FIG. 3a is a partial cross-sectioned view of a rod end including an electrical connector for the present invention MR fluid damper.
Figure 3B:
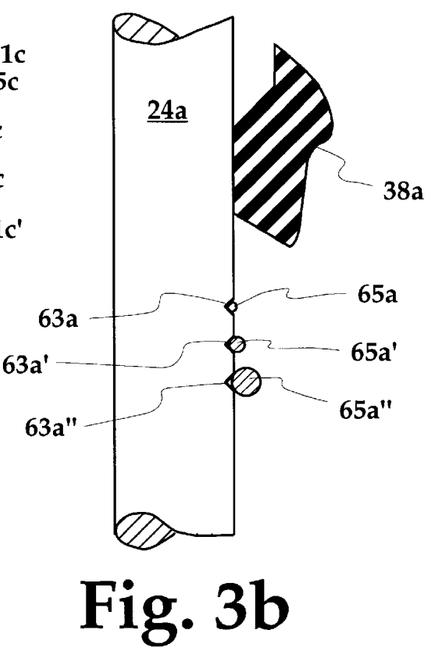
FIG. 3b is a partial sectioned view of a piston rod and seal illustrating the relationship between scratch depth and propensity of carrying/smuggling a MR particle underneath the seal.
Figure 3C:
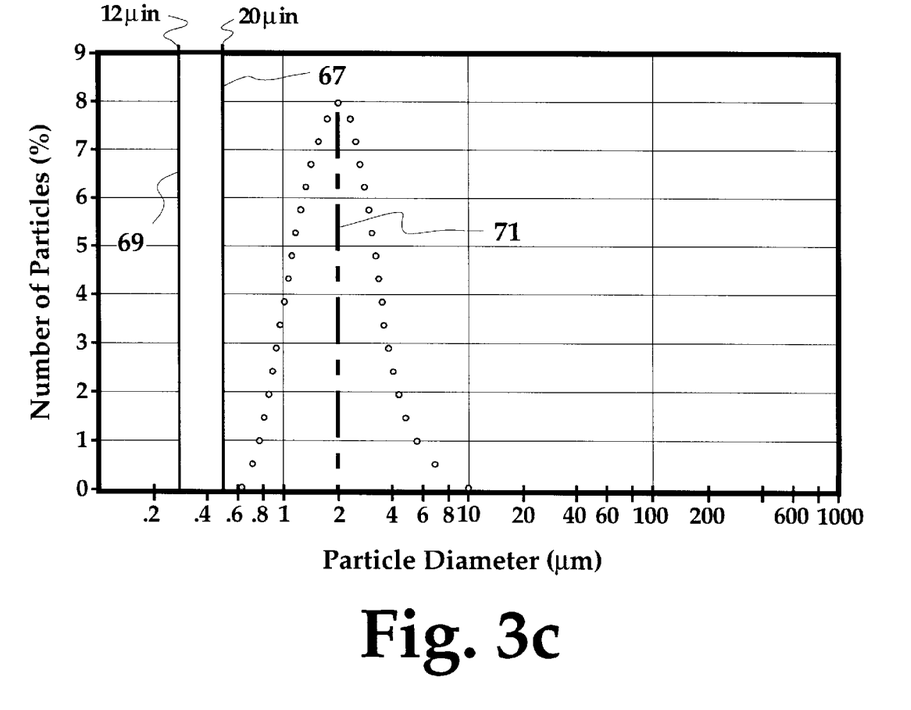
FIG. 3c is a graphical depiction illustrating a preferred size relationship between the surface finish (Rz) of the piston rod and nominal MR particle size.

FIG. 3a describes an alternate rod end 26c configuration including an electrical connector portion 55c. The electrical connector portion 55c provides the current to the single-strand conductor 52c. The electrical connector portion 55c includes an incoming connection 57c for making electrical contact with the single-strand conductor 52c and an outgoing connection 59c for making electrical contact with the piston rod 24c. Insulation 61c and 61c' prevents shorting to steel rod end 26c. Further insulation 50c insulates the single-strand conductor 52c from the piston rod 24c and insulator bushing 46c insulates the rod end 26c from the member it is attached to. If this rod end 26c were used, a similar bushing would be required on the end cap (e.g. 46b' of FIG. 2). A two-prong, sealing type electrical connector (not shown) electrically attaches to incoming and outgoing connections 57c and 59c.

Figure 5A:
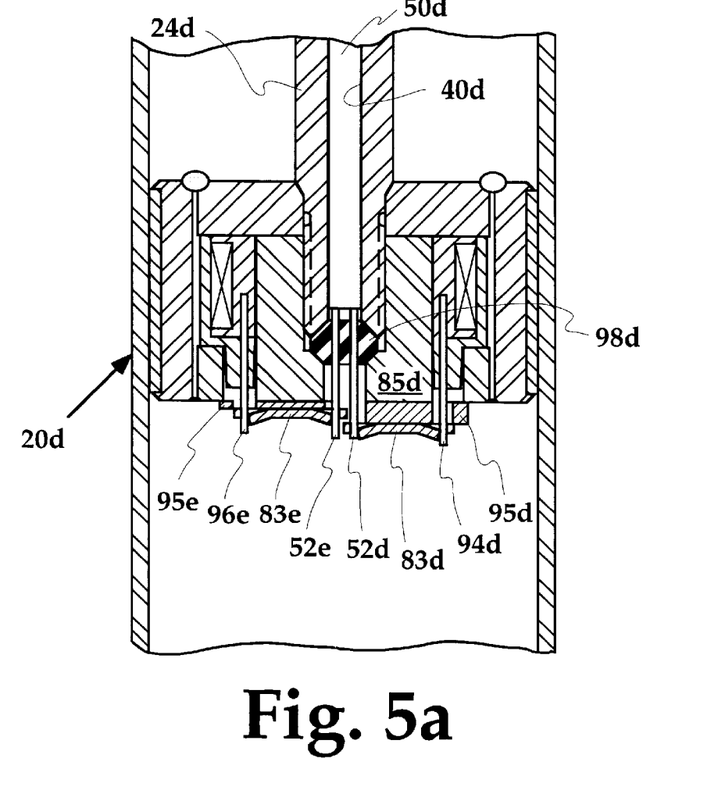
FIG. 5a is a partial cross-sectioned side view of a piston assembly including two single-strand electrical conductors, one for incoming and one for outgoing electrical current.
Figure 5B:
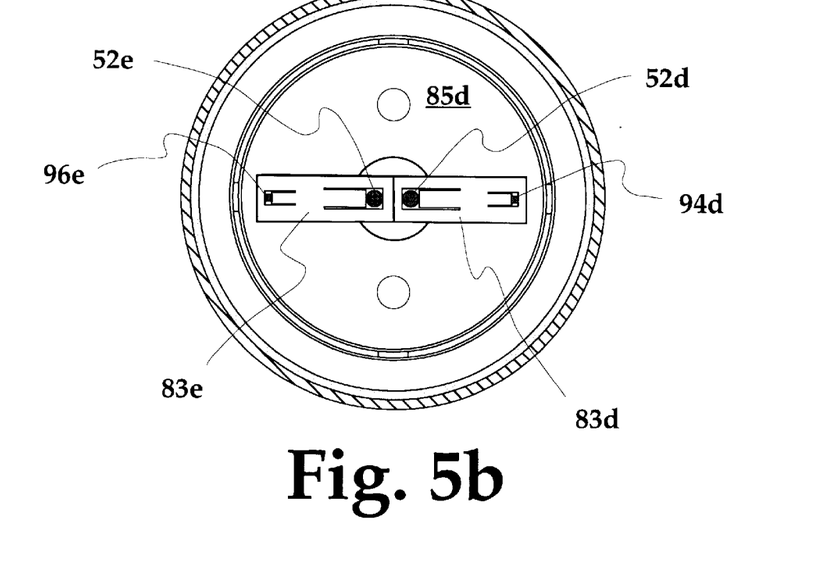

FIG. 5a and FIG. 5b illustrate another embodiment of the linear damper 20d including an incoming single-strand conductor 52d and an outgoing single-strand conductor 52e. The single-strand conductors 52d and 52e are insulated by insulation 50d, either individually or together, to prevent shorts to the bore 40d in the piston rod 24d. An elastomer element 98d compresses against end of the piston rod 24d and against bottom pole piece 85d upon assembly which causes the elastomer member to tightly seal about the peripheral diameter of the individual single-strand conductors 52d and 52e. A push-on connector 83d makes the electrical connection between the incoming single-strand conductor 52d and the first axial pin 94d. Thicker insulator plate 95d prevents shorting to the bottom pole piece 85d. Likewise, push-on connector 83e makes the electrical connection between the outgoing single-strand conductor 52e and the second axial pin 96e. Shorter insulator plate 95e prevents shorting to the bottom pole piece 85d. Staggering the push-on connectors 83d and 83e prevents shorting therebetween. It should be understood that this two single-strand embodiment would be preferred for use in vehicle primary suspension applications.

Figure 6:
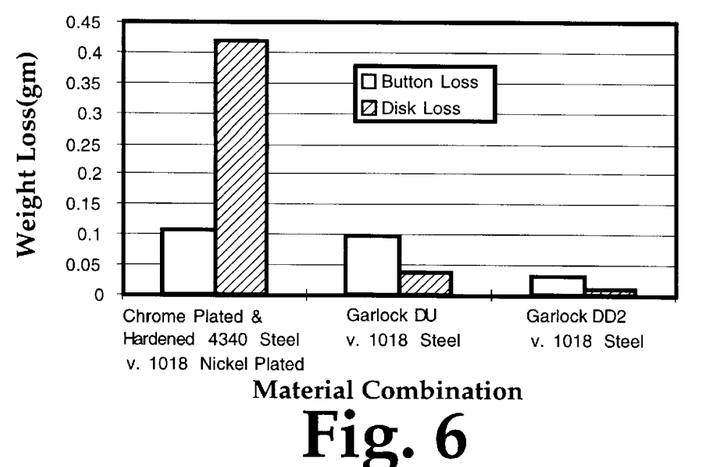
Figure 7:
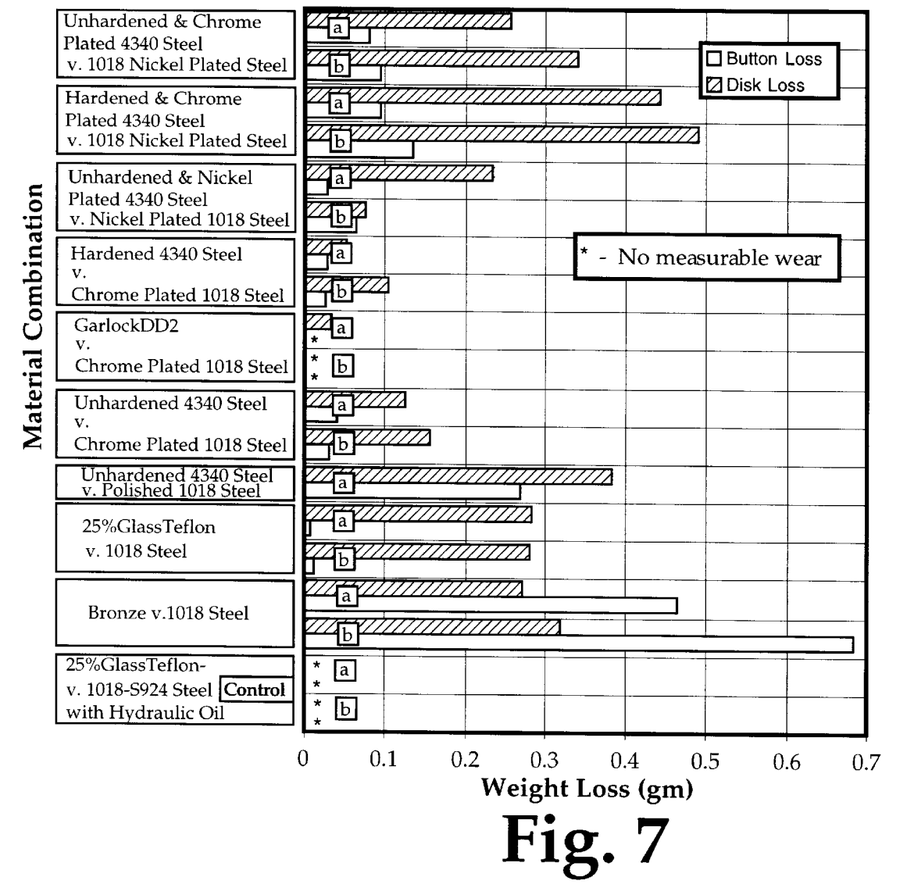

FIG. 6 and FIG. 7 represent the results of a significant amount of testing that was performed by the inventors to determine an appropriate and wear resistant wear band material combination for an MR damper. The test results represent the wear, i.e., weight loss of the buttons and discs with various wear material combinations based upon Tabor abraser testing of a 2 kg spring-loaded button wearing against a rotating disc for about 200,000 cycles while the rotating disc and button are immersed in a representative MR fluid. The button material represents the piston wear band whereas the disc material represents the material used for the damper housing. The representative MR fluid used in the testing includes carbonyl iron particles dispersed in a mineral oil fluid carrier having approximately 35% volume loading of particles and a nominal magnetically soft particle size of about 2 micron. This is believed to represent a typical MR fluid that may be used in linear MR dampers. In FIG. 6 the disc weight loss and button weight loss are depicted for three runs.

In FIG. 7, the disc weight loss and button weight loss are displayed for 10 material combinations, with two runs (a and b) each for all but the bronze and 1018 steel combination. For each material combination tested, the piston wear band material (button) is specified first and the damper body material (disc) is specified second.

e.g. Chrome Plated 4340 Steel
v. Nickel Plated 1018 Steel

It can generally be seen that the nonobvious and novel combination of 1018 and the Garlock material, and more specifically, Garlock DD2 when immersed in a representative MR fluid is significantly superior to the other wear combinations tried. Garlock DD2 is generally a steel material with a layer of porous bronze that is impregnated with a fluorinated polyethylene material.

While the preferred embodiments of the present invention have been described in detail, various modifications, alterations, changes and adaptations to the aforementioned may be made without departing from the spirit and scope of the present invention defined in the appended claims. It is intended that all such modifications, alterations and changes be considered part of the present invention.

What is claimed is:

1. In a controllable vibration device having a body defining an internal cavity, a piston cooperating with said internal cavity, means subdividing said internal cavity into an upper chamber and a lower chamber, a fluid contained within said upper and lower chambers, an electrically-controllable member controlling flow of said fluid in a fluid passage between said upper and lower chambers, the improvement comprising:

(a) circuit means for carrying a high-potential electrical current to said electrically-controllable member, said circuit means including a single-strand electrical conductor passing into said internal cavity,
    (b) means for completing said circuit means to a low-potential
    (c) a flexible sealing element closely surrounding said single-strand electrical wire, and
    (d) means for axially compressing said flexible sealing element such that said flexible sealing element radially expands into sealing engagement with said single-strand electrical conductor.

2. The device of claim 1 wherein said device is a controllable fluid damper, said body having an aperture formed therein, a piston rod slidably received within said aperture, and a piston attached to said piston rod.

3. The device of claim 2 wherein said sealing element is an elastomeric element for fluidic sealing against said single-strand electrical conductor wherein said elastomeric element is axially compressed between said piston rod and a portion of said piston to radially expand said elastomeric element into intimate contact with said single-strand electrical conductor and also into intimate contact with said portion of said piston.

4. The device of claim 2 wherein said circuit means comprises at least one electrically-conductive pin extending axially from, and integral with, a coil within said electrically controllable valve which is used to make electrical contact between said single-strand electrical conductor and said electrically-controllable valve.

5. The device of claim 4 further including a push-on electrical connector that engages one end of said single-strand wire and said at least one electrically conductive pin.

6. The device of claim 4 wherein said means for completing said circuit to low potential comprises a other electrically-conductive pin extending axially from, and integral with, said coil.

7. The device of claim 6 further comprising an insulator situated between a push-on electrical connector and a metal portion of said piston to prevent shorting of said circuit means.

8. The device of claim 4 wherein said piston comprises an upper pole piece and a separate annular ring, said annular ring being rigidly connected to said upper pole piece by multiple non-magnetic bridge elements.

9. The device of claim 8 wherein said multiple bridge elements include non-magnetic welds.

10. The device of claim 8 wherein said multiple bridge elements include non-magnetic pins.

11. The device of claim 4 further including an upper pole piece and an annular ring which are made in a one piece unit from a powdered metal material.

12. The device of claim 11 wherein said upper pole piece and said annular ring are made using a method selected from a group consisting of a Powder Injecting Molding (PIM) process and a Metal Injecting Molding (MIM) process as a single element.

13. The device of claim 8 wherein said annular ring defines an outer peripheral portion of said piston and said outer peripheral portion is equipped with at least one wear band manufactured from a magnetically soft material which forms a portion of a magnetic field generated within said valve.

14. The device of claim 13 wherein said at least one wear band further includes a friction reducing surface treatment thereon.

15. The device of claim 13 wherein said damper body is made of a magnetically soft material and, in conjunction with said wear band, form a substantial part of a magnetic circuit.

16. The device of claim 2 wherein said piston rod has a surface finish in which a scratch depth therein is less than about 25% of a nominal particle diameter of magnetically soft particles contained in a magnetorheological fluid and greater than Rz 12 microinch.

17. The device of claim 16 wherein said aperture is sealed against egress of said magnetorheological fluid and protected from side loading by a combination of a metal bushing and an elastomeric seal.

18. The device of claim 17 wherein said metal bushing further comprises a metal layer with a surface coating of porous material impregnated with a lead and fluorinated polyethylene polymer.

19. The device of claim 17 wherein said elastomeric seal comprises an energized lip seal manufactured from a fluorocarbon elastomer material.

20. The device of claim 17 wherein said elastomeric seal is manufactured from a fluorocarbon elastomer material that exhibits a durometer range between about 65 and about 90.

21. The device of claim 2 further comprising an accumulator assembly positioned adjacent to one of said first and second chambers, said accumulator assembly having an annular substantially rigid body portion including a seal which seals against an inner periphery of said damper body and a flexible portion having a flexibility higher than said rigid body portion sealingly secured to said body portion whereby said accumulator assembly permits low amplitude displacements of said piston to be accommodated by said flexible portion without sliding movement of said seal relative to said inner periphery.

22. The device of claim 21 wherein said flexible portion further comprises an elastomer diaphragm in communication with one of said first and second chambers and bonded to said annular substantially rigid body portion, said diaphragm including a substantial curvature which allows volume compensation without sliding of said seal.

23. The device of claim 2 wherein said damper body is made of a magnetically soft material, said fluid passage passes through said piston and said damper body forms a substantial part of a magnetic circuit.

24. In a controllable vibration device having a body which at least partially defines an internal cavity, a piston interacting with said internal cavity, and an electrically-controllable valve member, said electrically-controllable valve member comprising:
   a) a first flux carrying member including an axially extending substantially cylindrical portion,
   b) a second flux carrying member including a radially extending portion cooperating with said substantially cylindrical portion to form a passageway therebetween, said radially extending portion having two holes formed therein, and
   c) a coil assembly included within said electrically-controllable valve member and sandwiched between said first and second flux carrying member, said coil assembly further comprising a bobbin, a coiled wire which is hoop-wound about said bobbin, and two axially-directed, electrically-conductive pins electrically connected to said coiled wire and integral with said coil assembly, said two axially-directed, electrically-conductive pins adapted to carry electrical current being received in said two holes.

25. In a magnetorheological fluid damper having a damper body defining an internal cavity having an aperture formed therein, a piston rod slidably received within said aperture, a piston assembly attached to said piston rod subdividing said internal cavity into an upper chamber and a lower chamber, a magnetorheological fluid contained within said upper and lower chambers, an electrically-controllable valve controlling flow of said fluid between said upper and lower chambers, said piston assembly, comprising:
   a) a top pole piece of magnetically soft material;
   b) an annular outer ring surrounding said top pole piece also manufactured from a magnetically soft material;
   c) bridge means attaching said top pole piece to said outer ring and forming portions of a passageway between said ring and said top pole piece through which said fluid flows;
   d) a bottom pole piece connected to said piston rod and forming a another passageway portion between said ring and said bottom pole piece; and
   e) a coil assembly further comprising a bobbin, a wire coil which is hoop-wound about said bobbin, and at least one axially-directed, electrically-conductive pin electrically connected to said wire coil and integral with said coil assembly, said coil assembly clamped in position relative to said top pole piece and said bottom pole piece, a portion of said coil assembly surrounding an upper portion of said bottom pole piece and said electrically-conductive pin extends into a lower portion of said bottom pole piece.

26. The damper of claim 25 wherein said coil assembly further comprises a pair of axially=directed, electrically-conductive pins, a first pin interconnecting said coil assembly through a first electrical connector to a source of high potential electrical current and a second pin interconnecting said coil assembly through a second electrical connector to a low potential.

27. The damper of claim 26 wherein said first electrical connector is a push-on connector.

28. The damper of claim 25 wherein said coil assembly further comprises a molded portion forming at least one locator boss over said axially-directed, electrically-conductive pin which is received in at least one bore formed in said lower portion of said bottom pole piece.

29. The damper of claim 25 wherein said bridge means is comprised of a plurality of radially spaced nonmagnetic interconnections which cooperate with said annular ring and said top pole piece to form a plurality of arcuate passageway portions.

30. The damper of claim 25 wherein said damper body carries a substantial portion of a magnetic flux produced by energizing said coil assembly.

31. A magnetorheological (MR) fluid damper including a damper body having an internal cavity containing an amount of MR fluid and an aperture at one end, said aperture slidingly receiving a piston rod, means to seal said aperture against egress of fluid, said (MR) fluid damper comprising:
   a piston rod having a surface finish in which a nominal scratch depth (Rz) therein is less than about 25% of a nominal size of magnetically soft particles contained within said MR fluid and greater than Rz 12 microinch.

32. The MR fluid damper of claim 31 wherein said means to seal is further comprised of an energized elastomeric lip seal manufactured from a fluorocarbon elastomer material having a durometer range of between about 65 to about 90.

33. The MR fluid damper of claim 31 wherein said aperture slidingly receiving said piston rod includes a metallic bushing comprising an annulus of steel with a coating layer of porous material embedded with a lead and fluorinated polyethylene polymer.

34. The MR fluid damper of claim 31 wherein said piston rod has a nominal surface roughness in the range between about Rz 12 microinch and about Rz 20 microinch and said magnetically soft particles have a nominal diameter of between about 1 micron and about 6 microns.

35. A magnetorheological (MR) fluid damper, comprising:
  (a) a damper body made of magnetically soft material and at least partially defining an internal cavity which contains an amount of MR fluid therein, and
  (b) a piston assembly including
    i) a piston body which defines a portion of a magnetic circuit therein, said piston body including at least one wear band of a magnetically soft material secured about a peripheral portion thereof, said wear band also forming part of said magnetic circuit and carrying magnetic flux into said damper body,
    ii) a coil assembly for magnetically energizing said magnetic circuit and producing magnetic flux therein,
    iii) and a passageway passing through said piston containing an amount of MR fluid which changes rheology upon said energizing, said damper body forming a substantial part of said magnetic circuit.

36. The MR fluid damper of claim 35 wherein said wear band comprises an annulus of steel.

37. The MR fluid damper of claim 36 wherein said annulus of steel is treated with a friction reducing surface treatment.

38. The MR fluid damper of claim 36 wherein said friction reducing surface treatment is selected from the group consisting of porous bronze, nickel, fluorinated polyethylene polymer, and combinations thereof.

39. A single tube damper, comprising:
  (a) a damper body, having an end cap and a top cap defining an internal cavity containing an amount of liquid therein and having an aperture in said top cap,
  (b) a piston rod slidingly received in said aperture,
  (c) a piston secured to one end of said piston rod subdividing said internal cavity into two chambers, said piston including a first flux carrying member and a second flux carrying member cooperating to define at passageway and a coil assembly to generate a magnetic flux when energized which acts between said members and upon said fluid in said passageway,
  (d) circuit means including a single-strand electrical conductor electrically connected to said coil assembly, a flexible sealing element closely surrounding said electrical conductor, and means for compressing the sealing element such that the flexible sealing element expands into sealing engagement with said electrical conductor, and
  (e) a diaphragm assembly interacting with one of said two chambers and partially defining an accumulator chamber which is devoid of liquid, said diaphragm assembly being capable of movement in response to movement of said piston, said accumulator chamber being pressurized to between 100–500 psi without a fill valve.

40. A magnetorheological (MR) fluid damper, comprising:
  (a) a damper body at least partially defining an internal cavity which contains an amount of MR fluid therein and which has an aperture formed therein.
  (b) a piston rod slidingly received in said aperture, and
  (c) a piston assembly attached to said piston rod, subdividing said internal cavity into two chambers, said piston assembly including first and second flux carrying members cooperating to define a passageway and a coil assembly adapted to generate a magnetic flux which acts upon said passageway when energized, said piston assembly further including a wear surface for reducing friction between said piston assembly and said damper body which includes a primary metallic layer coated with a friction reducing surface treatment selected from a group consisting of porous bronze, nickel, fluorinated polyethylene polymer, and combinations thereof, and
  (d) circuit means including a single-strand electrical conductor electrically connected to said coil assembly, a flexible sealing element closely surrounding said electrical conductor, and means for compressing the sealing element such that the flexible sealing element expands into sealing engagement with said electrical conductor.

41. A magnetorheological (MR) fluid damper including a damper body having an internal cavity containing an amount of MR fluid and an aperture at one end, said aperture slidingly receiving a piston rod, means to seal said aperture against egress of fluid, said (MR) fluid damper comprising:
  a piston rod having a surface finish in which a nominal scratch depth (Rz) therein is in the range between about Rz 12 microinch and about Rz 20 microinch and magnetically soft particles contained within said MR fluid have a nominal diameter of between about 1 micron and about 6 microns.

* * * * *